A. D. SMITH.
SHAFT BEARING FOR STILLS.
APPLICATION FILED MAY 7, 1917.
1,295,223. Patented Feb. 25, 1919.
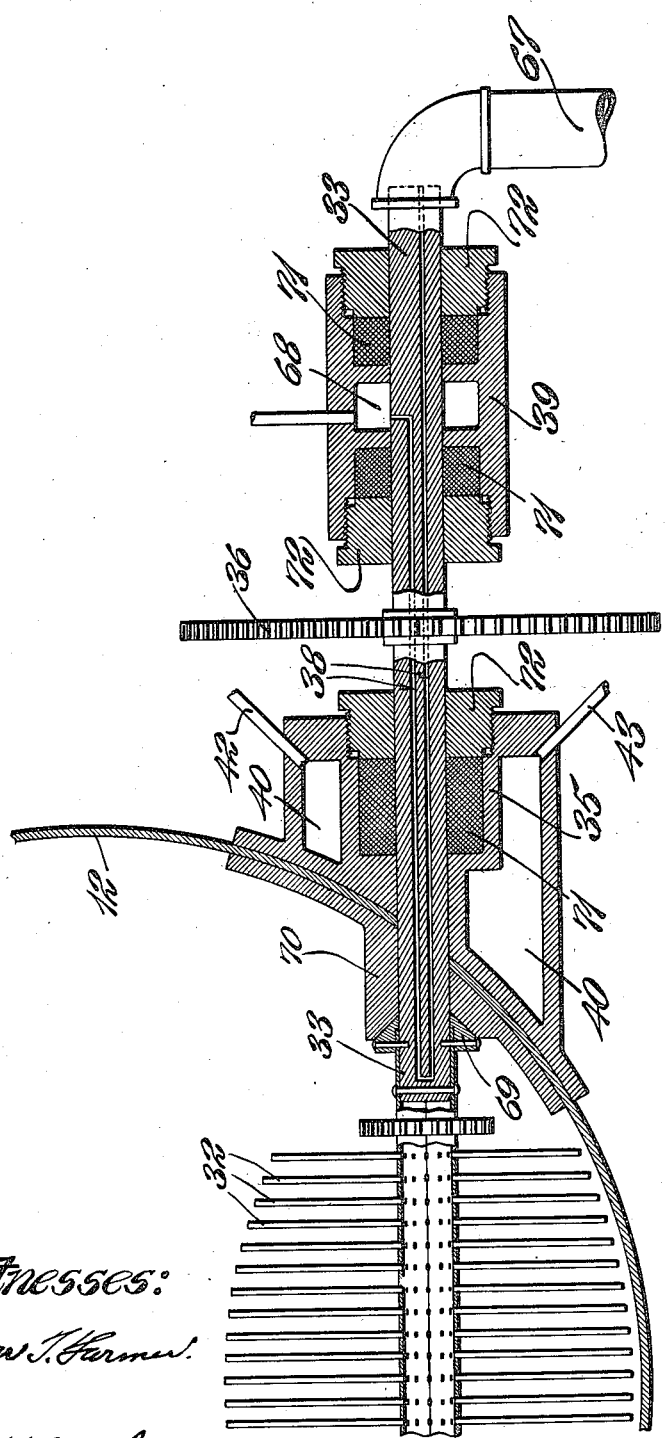

UNITED STATES PATENT OFFICE.

ARTHUR D. SMITH, OF ARKANSAS CITY, KANSAS.

SHAFT-BEARING FOR STILLS.

1,295,223.    Specification of Letters Patent.    Patented Feb. 25, 1919.

Application filed May 7, 1917. Serial No. 166,827.

*To all whom it may concern:*

Be it known that I, ARTHUR D. SMITH, a citizen of the United States, and a resident of Arkansas City, in the county of Cowley and State of Kansas, have invented a new and useful Improvement in Shaft-Bearings for Stills, of which the following is a specification.

This invention relates to bearings for brush shafts for stills of the type shown in my pending application Serial No. 154,469, which shafts are exposed to high temperatures, and the object of the invention is to keep the bearing cool and supplied with lubricant. A further object of the invention is to prevent excessive leakage of the contents of the still through the bearing.

The invention consists in forming the shaft with ducts for circulating a cooling fluid through it, and in providing means outside of the still for conducting the cooling fluid to and from the shaft. The invention further consists in surrounding the bearing with a space to which a cooling fluid can be supplied, and in providing the inner end of the bearing with a seat against which a collar or enlargement on the shaft bears to prevent the escape of an undue amount of the still contents through the bearing.

Further objects and details of the invention appear from the following description of a preferred form of the invention, reference being had to the accompanying drawings which illustrate the same. What is claimed as the invention appears from the appended claims.

The drawing is an enlarged vertical cross-section of a portion of the main shell of a still, on the axis of a brush shaft. The same reference characters are used to designate the parts in the drawing, as in my pending application, Serial No. 154,469, referred to above, in which the bearing is shown and described, but is not claimed as a separate invention apart from its combination with the still.

As described in said application, the shell 12 of the still contains a set of brushes 32, which are arranged to rotate on a shaft 33. The shaft 33 projects through an oil-cooled bearing 70 having a stuffing box 35, which is mounted on the outside of the still. A sprocket wheel 36 is mounted on the shaft outside of the still whereby the shaft may be rotated from any suitable source of power.

The shaft 33 is cooled by oil, or other suitable cooling fluid, which is circulated through a system of ducts 38 drilled axially in the shaft and leading from a stuffing box 39 on its outer end. A chamber 68 within the box 39 surrounds the shaft and communicates with the ducts 38 for supplying cooling fluid thereto. The ducts 38 discharge into a suitable pipe 67 at the end of the shaft for carrying off the heated cooling fluid to a suitable cooler to be cooled and used over again. The stuffing box 35 has a chamber 40 surrounding it through which oil or other suitable cooling fluid is pumped by means of the supply pipe 42 and discharge pipe 43.

The shaft 33 has a collar 69 on it which is provided with a conical face for seating against a conical depression in the inner end of the bearing 70, and preventing undue leakage of oil from the still through the bearing. The stuffing boxes 35 and 39 are provided with suitable packing 71 surrounding the shaft, and screw plugs 72 or other suitable means are provided for holding the packing compressed around the shaft for preventing leakage of oil through the stuffing boxes.

The invention is not restricted to the details of construction shown and described.

I claim the following as my invention:—

1. The combination with a still of a shaft extending through the curved wall thereof, a bearing for said shaft mounted on said curved wall, and comprising a member mounted inside of the still and a member mounted outside of the still, and means for preventing leakage, said means comprising a conical seat on the inner end of said inside member and an annular collar on said shaft fitting against said seat and packing interposed between the shaft and the bearing, the outside member of the bearing having a hollow chamber therein and means for passing a stream of cooling fluid through said chamber.

2. The combination with a still of a shaft extending through the curved wall thereof, a bearing for said shaft mounted on said curved wall and comprising a member mounted inside of the still and a member mounted outside of the still, and means for preventing leakage, said means comprising a conical seat on the inner end of said inside member and an annular collar on said shaft fitting against said seat and packing interposed between the shaft and the bearing, the outside member of the bearing having a hollow chamber therein and means for passing a stream of water through said chamber, said shaft having longitudinal ducts therein extending the full length of said bearing and means for passing a cooling fluid through said ducts.

Signed at Arkansas City, Kansas, this 3rd day of May, 1917.

ARTHUR D. SMITH.